May 25, 1937.  J. W. WHITE  2,081,521
BRAKE CONSTRUCTION
Filed March 27, 1933
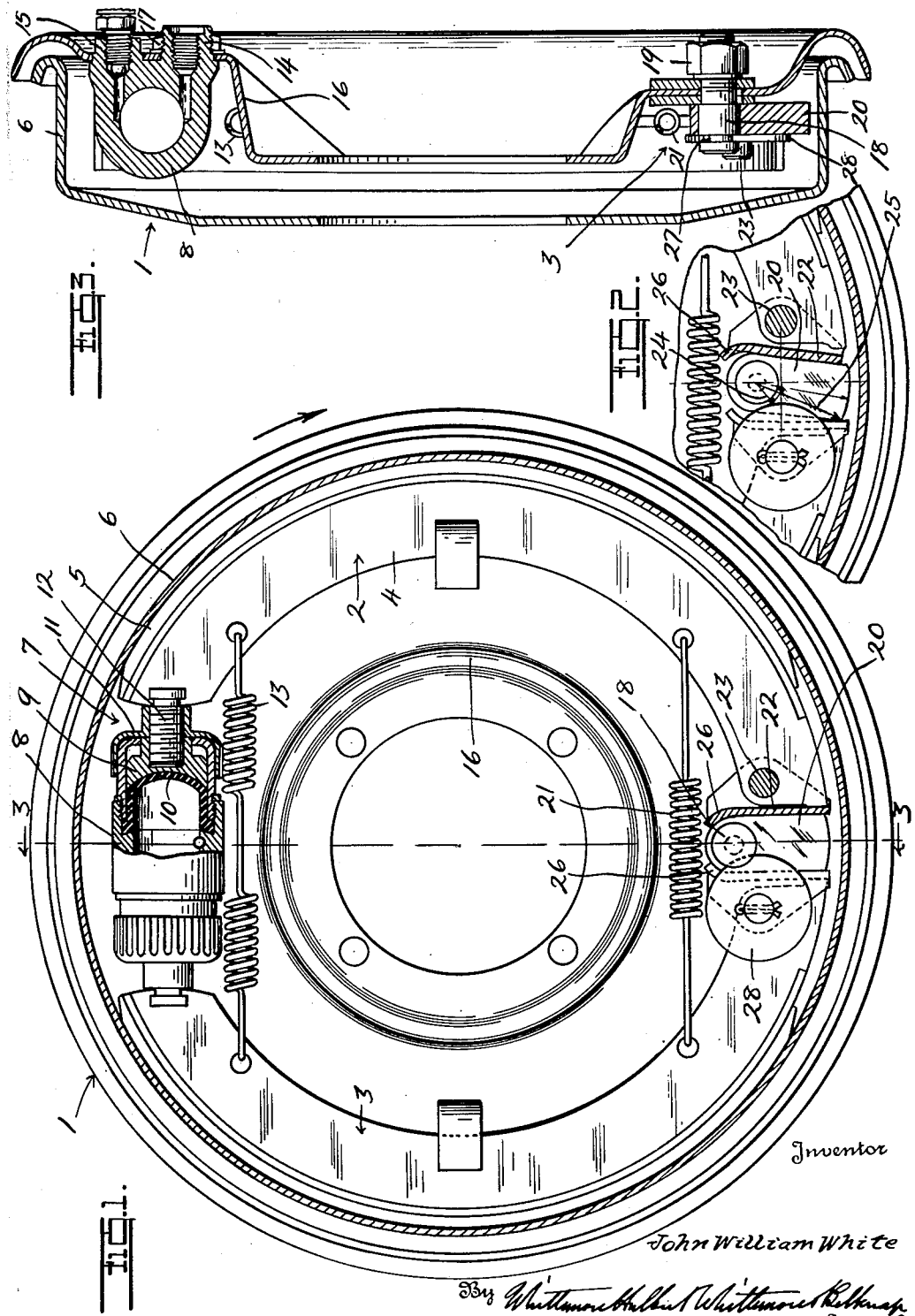
Inventor
John William White
By Whittemore Hulbert Whittemore Belknap
Attorneys Patented May 25, 1937

2,081,521

UNITED STATES PATENT OFFICE 2,081,521

BRAKE CONSTRUCTION

John William White, Detroit, Mich., assignor to Kelsey-Hayes Wheel Company, Detroit, Mich., a corporation of Delaware Application March 27, 1933, Serial No. 663,082

3 Claims. (Cl. 188—78)

The invention relates to brake constructions and refers more particularly to brake constructions for motor vehicle wheels. One of the objects of the invention is to provide an improved brake construction in which the actuator has a stationary part forming a stop for the brake friction means in either direction of rotation of the brake drum. Other objects are to provide a brake of the two shoe type in which with a single actuator both shoes act or wrap in either direction of rotation of the brake drum; to so construct the two shoe brake that each shoe accomplishes the same amount of work; and to so construct the two shoe brake that while one shoe actuates the other the brake is not materially servo in its action and is therefore reliable in its control.

These and other objects of the invention will become apparent from the following description, taken in connection with the accompanying drawing, in which Figure 1 is an elevation with parts broken away of a brake construction showing an embodiment of my invention;

Figure 2 is an elevation with parts broken away of a portion of Figure 1, showing the brake elements in a different position from that shown in Figure 1;

Figure 3 is a cross section on the line 3—3 of Figure 1.

As illustrated in the drawing, my brake construction comprises the brake drum 1 and the brake shoes 2 and 3 which form the brake friction means and which are located within the brake drum. Each of these brake shoes is arcuate in form and comprises the body 4 and the lining 5, the latter being adapted to frictionally engage the annular brake flange 6 of the brake drum.

For actuating the brake shoes, I have provided the single actuator 7 which is located between their upper ends and extends horizontally. This actuator is of the double acting type and, as shown, comprises the stationary cylindrical housing 8 within which is located a flexible sack for receiving the braking fluid under pressure and also the pistons 9 which abut the flexible rubber diaphragms 10 forming the flexible sack. 11 are nuts abutting the outer ends of the pistons 9 and threaded upon the screws 12 which are operatively connected at their outer ends to the upper ends of the brake shoes. The outer ends of the screws are preferably bifurcated to receive the upper ends of the brake shoes. These nuts 11 in the retracted position of the brake shoes are adapted to abut the ends of the cylindrical housing 8, the construction being such that the cylindrical housing forms stops at its ends for the upper ends of the brake shoes which are normally yieldably held in their retracted positions by the coil spring 13 extending therebetween and parallel to and radially inside the actuator. This actuator is shown, for example, in the copending application Serial Number 642,678 filed November 14th, 1932 in the names of Carl F. Baisch and John William White.

For securely positioning the actuator so that its housing is adapted to function as a stop for the brake shoes in either direction of rotation of the brake drum, this actuator, as shown more particularly in Figure 3, has the lugs 14 and 15 which extend through apertures in the backing plate 16 for the brake drum. The lug 14 is externally threaded and engaged by the nut 17 which effectively clamps the actuator to the backing plate. Both lugs 14 and 15 are provided with passageways connecting into the interior of the cylindrical housing of the actuator between the flexible diaphrams. The lug 14 is adapted to be operatively connected by a pipe to the master cylinder, shown for example in my copending application Serial Number 559,109, filed August 24th, 1931. The lug 15 provides for the escape of air during the initial filling of the braking system, including the actuator. After the filling operation, the passageway of the lug 15 is suitably closed.

18 is an anchor pin diametrically opposite the actuator 7 and effectively secured to the backing plate 16. This anchor pin is shouldered and has its enlarged portion at the inside of the backing plate and its reduced portion extending through the backing plate and threadedly engaged by the nut 19 which clamps the annular shoulder formed between the enlarged and reduced portions of the anchor pin against the backing plate.

The braking effort or retarding torque delivered by the leading brake shoe may be divided into a certain number of units, of which one unit arises from the pressure exerted by the actuator and other units arise from the wrapping effect of the brake shoe, the proportions of the units being dependent upon the coefficient of friction between the brake lining and the brake drum. In the present instance, with the brake drum rotating in the direction indicated by the arrow in Figure 1, 2 is the leading brake shoe and 3 the trailing brake shoe and it is assumed that the amount of work done by the leading brake shoe 2 is 3.66 units, of which one unit arises from the pressure exerted by the actuator and 2.66 units arise from the wrapping effect of the brake shoe.

For the purpose of having each brake shoe do the same amount of work, regardless of the direction of rotation of the brake drum, the brake shoes 2 and 3 are made alike and distributing means is provided between their lower ends for actuating the brake shoe from the other with a force substantially equal to that exerted by the actuator upon the last mentioned shoe. This means comprises the swinging member or distributor 20 which is journaled upon the enlarged portion of the anchor pin 18 and normally extends radially outwardly therefrom in the retracted position of the brake shoes, there being the coil spring 21 between their lower ends for retracting the same. 22 are abutment members or clips pivotally mounted at 23 upon the lower ends of the brake shoes and having portions extending across the ends of the brake shoes and adapted to engage the lower portions of their ends and the opposite sides of the swinging member. The abutment members or clips are adapted to swing upon their pivots away from the lower portions of the ends of the brake shoes, the abutment member or clip on the leading brake shoe only operating in this manner during the operation of the brake, while that on the trailing brake shoe remains in constant relation to this brake shoe. The arrangement is such that when the braking fluid is forced under pressure into the actuator 7 the leading brake shoe 2 is forced into engagement with the annular flange 6 of the brake drum, which carries this leading shoe with it, thereby exerting a pressure of 3.66 units upon the swinging member 20 through the abutment member 22 connected to the lower end of this brake shoe. The ratio of the leverage arm 24 through which this pressure acts upon the swinging member and the leverage arm 25 through which the swinging member acts upon the lower end of the trailing brake shoe 3 is 1 to approximately 3.66, so that as a result 2.66 units of accumulative braking of the leading brake shoe 2 are absorbed by the anchor pin 18 and 1 unit of accumulative braking is transferred to the lower end of the trailing brake shoe 3. Therefore, it will be seen that both brake shoes are given the same actuation pressure, so that the trailing brake shoe does 3.66 units of work, 2.66 units arising from the wrapping effect and its retarding torque is resisted by the end of the cylindrical housing of the actuator adjacent its upper end.

For the purpose of normally positioning the lower ends of the brake shoes, the abutment members or clips and the swinging member or distributor, the abutment members or clips are preferably provided with the rounded upper ends 26 which extend over and fit correspondingly shaped edges of the swinging member or distributor 20.

The anchor pin 18 is preferably provided with the annular groove 27 which is adapted to receive the washer 28 mounted upon the lower end of the brake shoe 3 and preferably the pivot 23, the arrangement being such that this washer assists in aligning the parts.

The construction is such that both brake shoes do the same amount of work regardless of the direction of rotation of the brake drum and only one piston of the actuator makes a stroke, since the other piston is held from outward movement by accumulated pressure of the brake shoe operatively connected to this piston. In this connection, it will be noted that the piston making the stroke is on the side of the leading brake shoe. However, it will also be noted that the contact portion of the swinging member or distributor 20 engaging the lower end of the trailing brake shoe travels 3.66 times as far as the pivot 23 connecting the lower end of the leading brake shoe to its abutment member or clip, so that a net gain is secured in distance between the lower ends of the brake shoes in that the trailing brake shoe is advanced 2.66 units of distance for every unit traveled by the leading brake shoe. As a result, the movement of the brake pedal acting through the master cylinder in the present instance to apply the brake disregarding other factors such as relative sizes of the master cylinder and the actuator, corresponds to the clearance between the leading brake shoe and the brake drum and the $$\frac{\text{clearance between the trailing brake shoe and the brake drum}}{2.66}$$

so that the pedal travel is materially reduced and therefore higher pedal leverage and lower pedal pressure may be secured.

What I claim is my invention is:

1. In a brake construction, a brake drum, a pair of brake shoes engageable with said drum, a single actuator between adjacent ends of said shoes, abutment members movably mounted upon the other adjacent ends of said shoes, a swinging member between said abutment members and freely abutting the latter, an anchor pin for said swinging member, spring means between said last mentioned adjacent ends of said shoes for normally urging the same toward each other, and cooperating means upon said abutment members and swinging member for normally positioning said last mentioned adjacent ends of said shoes with respect to said anchor pin.

2. In a brake construction, a brake drum, a pair of brake shoes engageable with said drum, a single actuator for said shoes, an anchor pin diametrically opposite said actuator, a swinging member mounted on said anchor pin, abutment members pivotally mounted on adjacent ends of said shoes and located at opposite sides of and freely abutting said swinging member, and cooperating means for normally holding said swinging member and at least one of said shoes in alignment.

3. In a brake construction, a brake drum, a pair of brake shoes engageable with said drum, a single actuator for said shoes, an anchor pin diametrically opposite said actuator, a swinging member mounted on said anchor pin, abutment members pivotally mounted on adjacent ends of said shoes and located at opposite sides of said swinging member, and an alignment washer carried by one of said shoes and extending over said swinging member and normally engaging said anchor pin.

JOHN WILLIAM WHITE.